(12) United States Patent
Flores

(10) Patent No.: US 7,849,787 B2
(45) Date of Patent: Dec. 14, 2010

(54) ROLLED SHELL AND STUFFER APPARATUS

(76) Inventor: Albert Flores, 661 Hamilton Dairy Rd., Hot Springs, AR (US) 71909

( * ) Notice: Subject to any disclaimer, the term of this patent is extended or adjusted under 35 U.S.C. 154(b) by 1518 days.

(21) Appl. No.: 11/208,329

(22) Filed: Aug. 18, 2005

(65) Prior Publication Data

US 2007/0039482 A1    Feb. 22, 2007

(51) Int. Cl.
   *A47J 37/12*    (2006.01)
(52) U.S. Cl. .............................. 99/353; 99/354; 99/416; 99/442
(58) Field of Classification Search ........... 99/352–355, 99/450.1–450.8, 337–340, 422–442, 494, 99/516; D7/672–675, 368, 669; 249/92, 249/119, 122; 425/92, 128, 403, 425, 112–113
   See application file for complete search history.

(56) References Cited

U.S. PATENT DOCUMENTS

| | | | |
|---|---|---|---|
| 3,424,076 A * | 1/1969 | Brady et al. | 99/416 |
| 3,690,248 A * | 9/1972 | Schafer | 99/450.2 |
| 4,047,478 A * | 9/1977 | Trostmann et al. | 99/450.1 |
| 4,212,234 A * | 7/1980 | DeCourcy | 99/426 |
| 4,313,964 A * | 2/1982 | Dembecki | 426/138 |
| 4,388,059 A * | 6/1983 | Ma | 425/112 |
| 4,430,930 A * | 2/1984 | Walser | 99/331 |
| 4,457,225 A * | 7/1984 | Bakker | 99/450.6 |
| 4,516,487 A * | 5/1985 | Madison et al. | 99/450.6 |
| 4,517,785 A * | 5/1985 | Masuda | 53/116 |
| 4,533,559 A * | 8/1985 | Rowell | 426/499 |
| 4,592,272 A * | 6/1986 | Rowell | 99/353 |
| 4,651,635 A * | 3/1987 | Ally | 99/450.6 |
| 5,009,902 A * | 4/1991 | Mercenari | 426/138 |
| 5,085,138 A * | 2/1992 | Fehr et al. | 99/450.6 |
| 6,780,453 B1 * | 8/2004 | Smith | 426/523 |
| 6,843,169 B2 * | 1/2005 | Nielsen | 99/489 |
| D528,875 S * | 9/2006 | Nerbas | D7/672 |
| 2006/0107846 A1* | 5/2006 | Foulon et al. | 99/450.1 |

* cited by examiner

*Primary Examiner*—Joseph M Pelham
(74) *Attorney, Agent, or Firm*—Curtis L. Harrington; Kathy E. Harrington; Harrington & Harrington

(57) ABSTRACT

A rolled shell and stuffer apparatus, particularly useful for deep frying, utilizes a number of structures which together provide the ability to quickly produce a large number of stuffed taquito type shells having high quality. The basic components of the system include a shell mold having an outer diameter of about 0.5 inches for example, formation mandrel, a rolling support, a frying support, a removal support, a stuffing system, and an optional handling tool. As will be seen, the degree of interrelatedness of these components can vary, but the result is a uniformity of high quality product which enables a wider range of food stuffing.

7 Claims, 4 Drawing Sheets

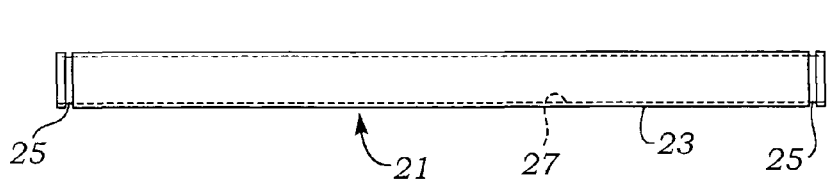
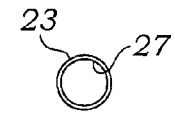
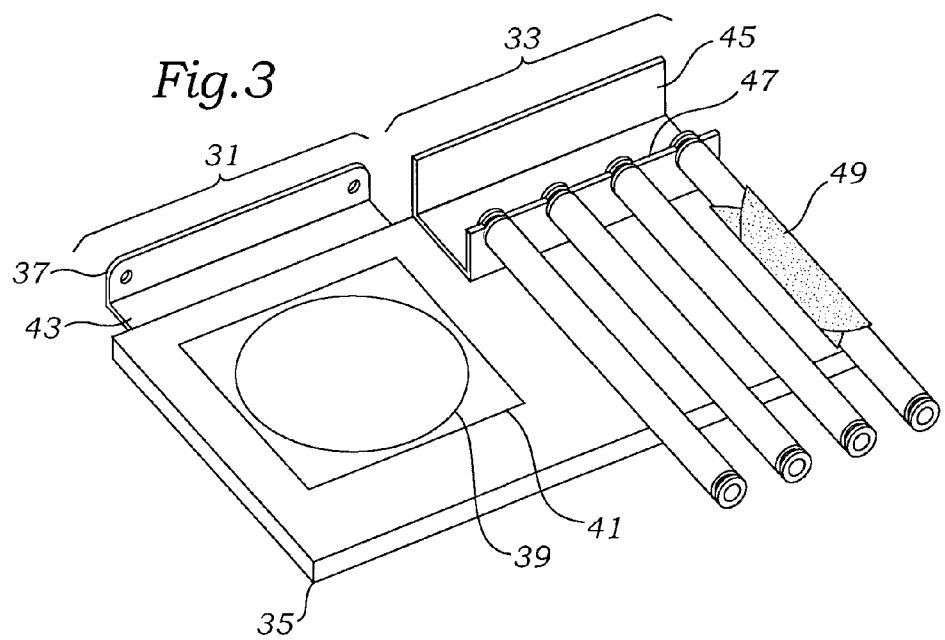
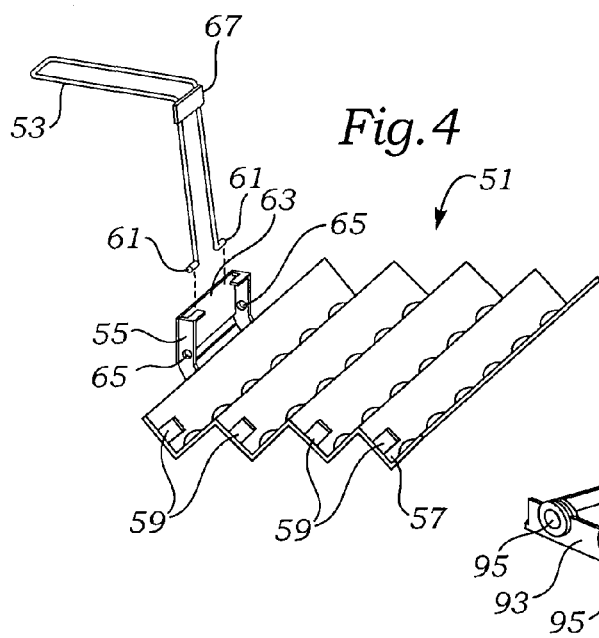
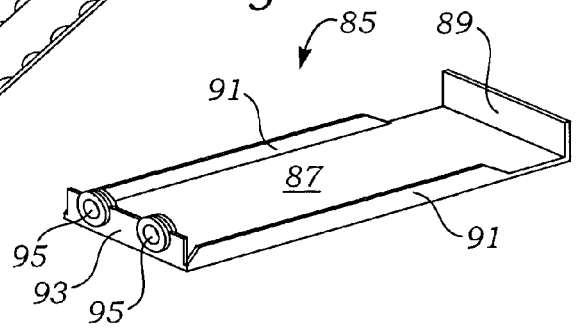

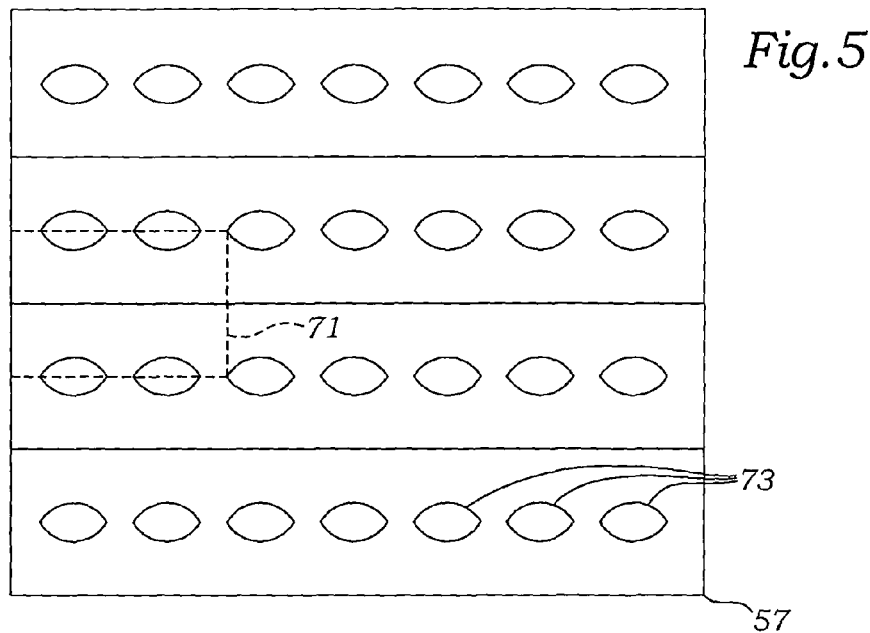
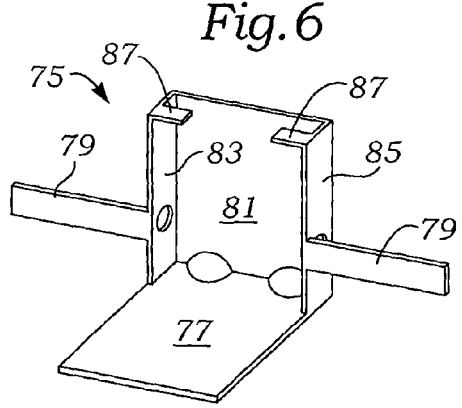
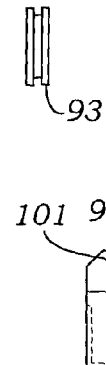
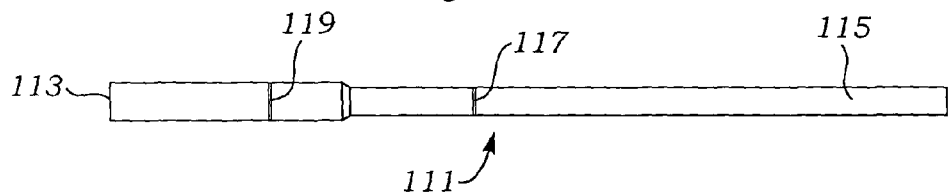

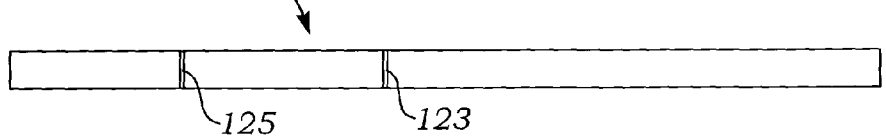
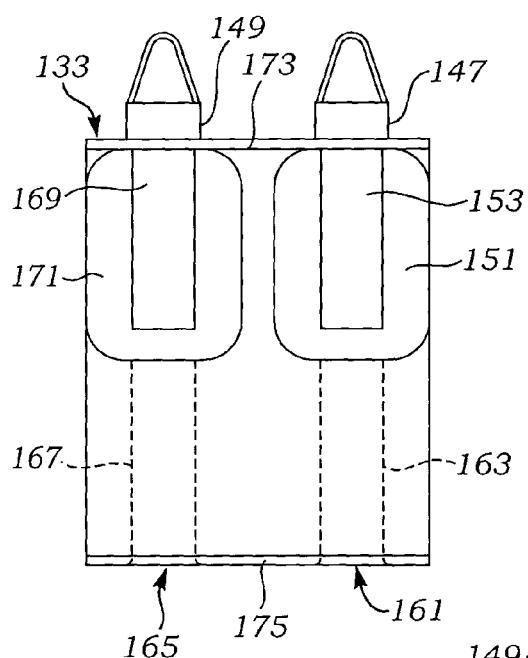
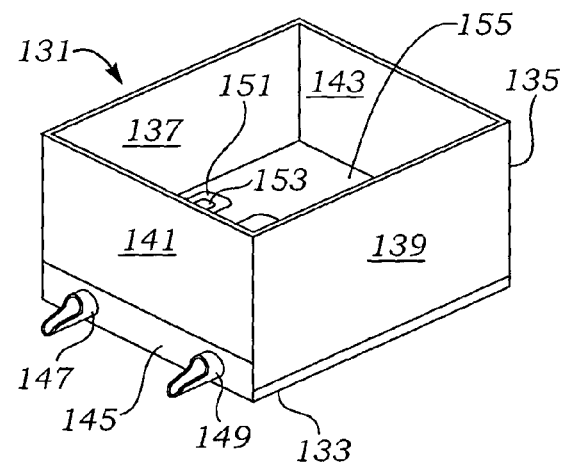
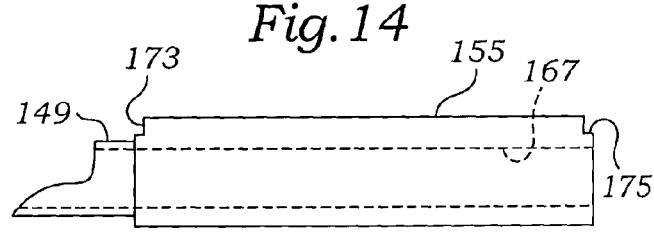
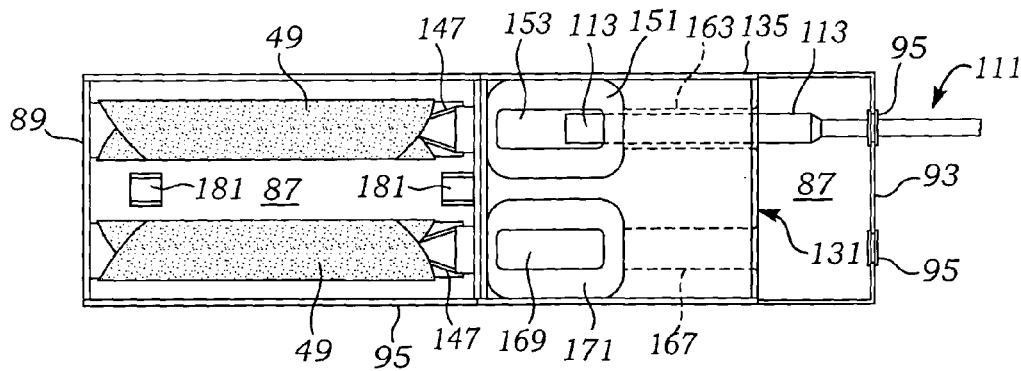

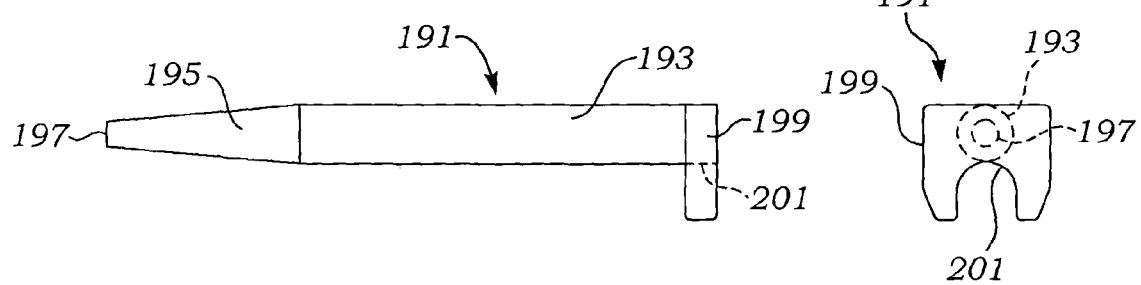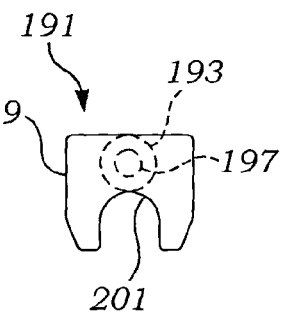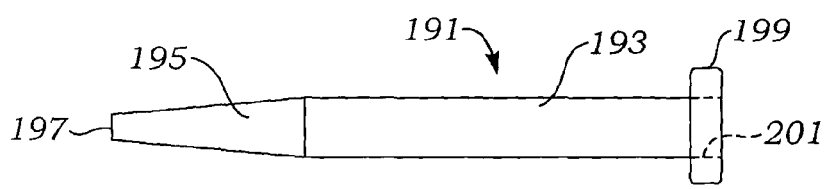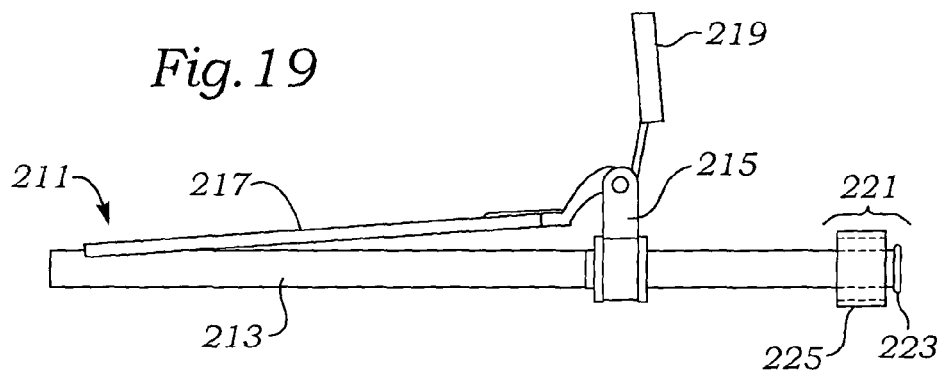

ROLLED SHELL AND STUFFER APPARATUS

FIELD OF THE INVENTION

The present invention relates to a system for manufacture and completion of stuffed rolled shells, and more particularly to devices for forming a rolled shell, maintaining the rolled shell shape during cooking and hardening, unloading the formed shells, and a device for both supporting and facilitating the loading of a variety of foodstuffs to be enclosed by the shell.

BACKGROUND OF THE INVENTION

It is conventionally known to form corn based tortilla which is typically a round flat planar area of material, about which a filler may be wrapped. It is known that the shape may be made into a bowl and then fried to make a taco salad vessel. It can also be formed into a "U" shape to form a shell for adding toppings to form a regular taco.

It is also known to add material to a tortilla and to wrap it tightly into a cylindrical roll, followed by frying until the corn outer taco covering has a hard consistency. Beef or chicken is typically utilized as a filler. The result has been popularly referred to as a "taquito" which is a word meaning "little taco". Hereafter, the term flauta (expanse of soft corn taco material or flour taco material) will be used, even though other edible material such as soy, pastry, bread, egg, just to name a few an be used. Problems with this food preparation include thermal and oil absorption problems.

Thermal problems arise from several sources, including the thickness of the material to be hardened on cooking, temperature of the oil, water content and starting temperature of the stuffing rolled with the flauta, and whether the stuffing is already cooked or whether it must be cooked in the shell. In some cases where the stuffing has high water content, the stuffing explodes upon frying and destroys the tightness of the roll. Where the stuffing expands or air is introduced, they may require longer to cook the material used for stuffing.

Another thermal problem arises from the shape of the flauta itself. Forming a tube from a round expanse of flauta translates to a thicker middle than at the ends. Where long cooking time is required, the thinner ends can become overdone when exposed to the hot oil for a time sufficient to thermally penetrate the middle section and cook the stuffing.

Oil absorption is another problem. Some stuffing material has a significant affinity for the oil causing the resulting taquito to hold a significant volume of oil. Fried flauta already has a some oil content, but a stuffing such as meat can wick significant amounts of oil into its inner volume and hold the oil, even against significant draining. Some types of entrained oil can further harden into a semi-solid at room temperature.

What is needed is a system which eliminates, to the extent possible, uneven cooking, the deleterious effects of different types of stuffing, prevents oil entrapment, promotes draining, and facilitates the use of a wider variety of food stuffing including stuffings which don't need cooking and for which cooking would destroy the stuffing.

SUMMARY OF THE INVENTION

A rolled shell and stuffer apparatus, particularly useful for deep frying, utilizes a number of structures which together provide the ability to quickly produce a large number of stuffed taquito type shells having high quality. The basic components of the system include a shell mold having an outer diameter of about 0.5 inches for example, formation mandrel, a rolling support, a frying support, a removal support, a stuffing system, and an optional handling tool. As will be seen, the degree of interrelatedness of these components can vary, but the result is a uniformity of high quality product which enables a wider range of food stuffing.

A formation mandrel is a tube which may be cylindrical or gently tapered. Constant cross sectional shapes include circular, oval, elliptical, triangular, square, and polygonal (both even and uneven). The formation mandrel can be solid, may have an engagement bore, a through bore, or may be made of thinner material to more instantaneously come up to the temperature of the oil in which cooking occurs. The formation mandrel preferably has an engagement structure to steady the mandrel after cooking to assist in removal of the cooked shell, such as a groove, hook, circumferentially outwardly disposed land, a projection, or magnetic holder. The formation mandrel may have a series of holes, grooves, or other structure to help bring hot cooking oil to a position between the mandrel and the wrapped flauta to facilitate cooking and removal. The use of longitudinal grooves, for example, reduces the surface area of contact between the mandrel and the flauta to further reduce a chance of sticking, without compromising the external diameter of the mandrel and while facilitating oil contact with the flauta innermost surface.

The shape of the flauta material wrapped upon the mandrel may be any shape, including round, rectangular or complex. The wrap may be a roll from one edge or it may be a spiral with partial overlap or folded or any other shape which can surround the mandrel and form a desired space after removal of the mandrel.

An optional rolling support may include a designated area for storage or stacking of the flauta sheets and a mandrel guide to enable a user to more rapidly acquire a consistency of action as to the rolling process. By enabling a user to start and finish at the same place each time, a user will more rapidly acquire consistency in the process of application of the flauta sheet onto the mandrel. The same structure used for the rolling support may also be used to support the mandrels after the shells are formed during cooking.

A frying support includes a handle to enable ease and control of manual transport and handling in the oil, as well as a series of shaped separate compartments which need not follow the external shape of the mandrel, but which will provide a sufficient support, combined with the gravity press of the combined weight of the flauta roll and mandrel to hold the newly flauta surrounded mandrel in place to maintain the tight wrap.

A removal support should accomplish several tasks. First, if applicable, it should assist in removal of the mandrels from the frying support. Given that the frying support can be a wide variety of structures, the removal support should have a configuration which at least assists in freeing the frying support constraint which kept the flauta in a formed position prior to cooking. The removal support may accomplish the separation of the mandrels and cooked flauta either collectively by keeping the array of mandrels in order, or non-collectively for later individual treatment. The removal support should provide for additional drainage of oil and may have an absorbent material. A vertical support with a series of slots can be used to interfit with grooves in the mandrel to provide a more rigid support. Magnetic assisted removal may also occur.

Where the mandrels are supported rigidly, a comb or other simultaneous shell removal structure may be employed to remove the cooked shell from the mandrels. The shells may be removably placed into a loading support or stuffer alignment holder channel, either directly upon removal from the mandrels or individually, one at a time. Once the shells are supported by the stuffer alignment channel, the loosely organized alignment of a number of shells facilitates approach by a feeding hopper having one or more spouts having tapered or cannulated exit fittings. The tapered or cannulated exit fittings engage and further align the supported shells and form a movement constraint environment from which the shell may be filled with other food fillings.

A hopper may be manual or motorized and any number of methods and techniques may be used to determine the extent of fill. A manual push rod may be used with manual feed back to measure the degree of fill of the shell. A mark on the fill rod may be used to indicate the extent of fill without having to remove the shell and visually inspect it. Once filled, the filled shells are removed and stored.

BRIEF DESCRIPTION OF THE DRAWINGS

The invention, its configuration, construction, and operation will be best further described in the following detailed description, taken in conjunction with the accompanying drawings in which:

FIG. 1 is a plan view of one embodiment of a cylinder mandrel having bilateral symmetrical grooves about its opposite ends;

FIG. 2 is a view looking into the end of the cylinder mandrel of FIG. 1 and illustrating its hollow through bore;

FIG. 3 is a perspective view of a combined rolling support and cylinder mandrel unloading and cooked flauta drainage support;

FIG. 4 is a perspective of a frying support;

FIG. 5 is a view looking down upon a multi support tray seen in FIG. 4;

FIG. 6 is an isolated view of a support structure for attaching to the multi support tray seen in FIGS. 4-5;

FIG. 7 is a perspective view of a simple stuffing support;

FIG. 8 is a side view of a bushing;

FIG. 9 is an end view of the simple stuffing support seen in FIG. 7;

FIG. 10 is a plan view of a first embodiment of a stuffer rod;

FIG. 11 is a plan view of a second embodiment of a stuffer rod;

FIG. 12 is a perspective view of an assembled stuffer box with base and four sided box structure;

FIG. 13 is a top view of a base of the stuffer box seen in FIG. 12 with the four sided box structure removed.

FIG. 14 is a side view of the base of the stuffer box seen in FIG. 12;

FIG. 15 is a top plan view looking down into the stuffer box of FIG. 12 seen in mated position with the simple stuffing support of FIG. 7;

FIG. 16 is a side view of a handling tool;

FIG. 17 is a top view of the handling tool of FIG. 16;

FIG. 18 is an end view looking into the end plate of the handling tool seen in FIGS. 16 and 17; and FIG. 19 is a further embodiment of a cylinder mandrel with an integrally mounted keeper.

DETAILED DESCRIPTION OF THE PREFERRED EMBODIMENT

Referring to FIG. 1, a plan view of one embodiment of a cylinder mandrel 21 illustrates a smooth cylindrical surface 23 interrupted just before each end by a pair of grooves 25. The grooves 25 are utilized by other structures to help engage and move the cylinder mandrel 21 when its hot. Other structures can be used, including projections, loops, and other structures. An internal bore 27 is seen in dashed line format in FIG. 1.

Referring to FIG. 2, a view looking into the end of the cylinder mandrel 21 of FIG. 1 illustrating its hollow through bore 27. As can be seen the bore 27 is large to leave the cylinder mandrel 21 with a relatively thin wall, but not so thin that the grooves 25 cannot be effectively made with enough depth to provide a catch to an edge of another structure so as to enable the other structure to engage the grooves.

In one embodiment, where the exterior diameter of the smooth cylindrical surface 23 of the cylinder mandrel 21 is to have a diameter of 0.50 inches, the internal diameter of the bore 27 is preferably about 0.44 inches. This leaves 0.06 inches to be distributed to both sides to yield a wall thickness of about 0.03 inches. The grooves 25 may then be about 0.20 inches deep, and possibly as much as 0.06 inches wide. Overall, the cylinder mandrel 21 may be about 6.5 inches long.

The use of a large bore 27 permits a relatively thin walled cylinder mandrel 21 which will hold up well under rolling pressure, less metal material for faster heating, quicker cooking and quicker cooling after cooking, and a bore through which hot liquid oil may freely circulate. Holes or apertures which extend circumferentially about the cylinder mandrel 21 can be added for increased oil circulation and quick draining, but in such a case, the draining cannot be controlled and directed as it can with a solid cylinder mandrel 21. Further, the surface 23 need not be smooth, but may also be longitudinally grooved to give more hot oil the ability to circulate around the flauta being cooked, so long as the grooves are thin enough (perhaps along with a layer of flauta which is not very pasty) to cause the flauta material to sink into the longitudinal grooves within the cylinder mandrel 21.

Referring to FIG. 3, a rolling support 31 is shown combined (although they need not be) with a the cylinder mandrel (cylinder mandrel 21) unloading and cooked flauta drainage support 33, hereafter referred to as unloading and drainage support 33. Although shown as having a common board 35, the rolling support 31 and unloading and drainage support 33 may have separate boards. On the unloading and drainage support 33, a vertical stop 37 is used as a low friction guide along which a cylinder mandrel 21 can slide as the cylinder mandrel 21 is rolled over a circular area 39 used for circular shaped flauta or a rectangular area 41 used for rectangular shaped flauta. The vertical stop 37 also sets the position of the flauta material from the end of the cylinder mandrel 21.

A lowered surface 43 may be provided to give some additional clearance for grasping the flauta material and cylinder mandrel 21 after the flauta material is rolled on it. Typically the cylinder mandrel 21 will be placed about an inch toward the inside of the material on the side farthest from the unloading and drainage support 33, the end edge is placed over the cylinder mandrel 21 in the direction of the unloading and drainage support 33, and then the cylinder mandrel 21 is rolled in a tight manner to form wrapped configuration. Once the flauta material is rolled onto the cylinder mandrel 21, the flauta material should be held manually tightly as the wrapped flauta and cylinder mandrel 21 are transferred.

Since the rolling support 31 and unloading and drainage support 33 are shown as an integrated unit, the unloading and unloading and drainage support 33 (hereafter drainage support) will be discussed. On the same side of the board 35 as the vertical stop 37, a channel 45 having an overall "U" shape is seen. The far side has a straight edge, but the near side has a series of notches 47, each having a "V" upper portion and a curved lower portion (as will be seen in greater detail). This structure facilitates the engagement of the near side of the channel 45 with the grooves 25 on the cylinder mandrel 21.

This enables the cylinder mandrels 21 to be removed from a structure supporting them in a configuration approximating their spacing seen in FIG. 3. Also seen on one of the cylinder mandrels 21 is a cooked shell 49.

Because the near side of the channel 45 is raised an inch or two above the level of the board 35, and because the other ends of the cylinder mandrels 21 are supported at board 35 level, the cylinder mandrels 21 are tilted. This enables any excess cooking oil, either within the cylinder mandrels 21, or on the outside to drain into a separate area or container or absorbent material which may optionally be provided. In the alternative, other structures may be provided to support the cylinder mandrels 21 without touching the board 35 and possibly at a lesser angle of tilt. A catch basin may be provided to collect the excess oil.

Referring to FIG. 4, a frying support 51 is seen. Frying support 51 includes a handle portion 53, a support structure 55, and a multi support tray 57. The handle portion 53 may be angled for maximum ease and utilization for a given orientation immersion fryer (not shown). The handle portion 53 may be removable from or permanently affixed to the support structure 55. The support structure 55 has a structure which provides force matching between the handle portion 53 and the multi support tray 57.

The multi support tray 57 is seen as a sharply angled undulation series of slots and ridges. It is understood that the purpose of the multi support tray 57 is to provide adequate support for a wrapped flauta and cylinder mandrel 21 before cooking which will stably support it in its wrapped condition before and throughout the cooking process. The wrapped flauta and cylinder mandrel 21 may be formed from a single sheet of material and may have a series of guard tabs 59 to enable the multi support tray 57 to be tilted in the direction longitudinal with respect to the ridges without loss of the wrapped flauta and cylinder mandrel 21. The guard tabs 59 in essence create a drainage side preference where turning and drainage can occur without touching the wrapped flauta and cylinder mandrel 21. It is understood that the triangular folds of the multi support tray 57 are generally good for supporting a round wrapped flauta and cylinder mandrel 21 and also for supporting a wide variety of other shapes of wrapped flauta and cylinder mandrel 21. The shape of the multi support tray 57 can vary to become more complementary to the shape of the wrapped flauta and cylinder mandrel 21.

The dimensions which have been found to work well for multi support tray 57 include a length of material from peak to peak of about 1.25 inches, where each section is angled at about ninety degrees. Each of the guard tabs by have a square dimension of about 0.4 inches. After folding, the multi support tray 57 is about 5.0 inches by about 5.5 inches with the longer unfolded dimension extending away from the support structure 55. Before folding, each of the folds is approximately 1 inch, which causes the unfolded multi support tray 57 to have a dimension of about 5.5 inches by about 8.0 inches.

The mounting of the support structure 55 in FIG. 4 is along an edge of the multi support tray 57. An alternative location is along the serpentine edge of the multi support tray 57, especially adjacent the location in which the guard tabs 59 are shown in FIG. 4. Also seen in FIG. 4 are some details of the handle portion 53 including a pair of outwardly directed members 61 which fits through a slot 63 on the support structure 55 and into engagement with a pair of apertures 65. A sliding hold off member 67 can be moved downward to lock the handle portion 53 into place.

Referring to FIG. 5, a top view of an unfolded multi support tray 57 indicates a location of an alternative support structure with dashed lines indicating a support area 71. A series of openings 73 are shown which, given the dimensions set forth above, may be formed as 0.5 inch diameter holes prior to folding.

Referring to FIG. 6, a folded box bracket is seen as a support structure 75 which may be advantageously located in the support area 71 seen in FIG. 5. Support structure 75 has a lower plate 77 which will be tack welded to the multi support tray 57. A pair of laterally extending wings 79 will extend the interference of an upper plate 71 of the support structure 75 which naturally guards or interferes with the middle two "V" shaped channels of the multi support tray 57. The presence and location of the support structure 75, along with the presence of the laterally extending wings 79, provides a stop for all four "V" shaped channels seen.

The upper plate 81 has a pair of side plates 83 and 85, each of which have opposing upper tab folds 87. The upper tab folds 87 help guide the ends of the handle portion 53 in the same manner as was explained for FIG. 4, and prevents a hinge action between the portions of the handle portion 53 adjacent ends 61. The structure needed to prevent forward motion should be slight as the loaded weight upon the multi support tray 57 should urge the weight of the handle portion 53 adjacent a vertical plate 81.

Stuffing of the cooked shell 49 can be accomplished with a variety of structures and techniques. Where a cream is stuffed, a smaller pipe can be introduced to extrude material as the pipe is withdrawn back through the shell 49.

Stuffing with solid foodstuffs presents a completely different set of problems. Stuffing with shredded meat, for example, can be difficult. Shredding the stuffing material to too small a size can change the taste and consistency of the final foodstuff structure. Another problem is support, both during stuffing and during eating. Where the stuffing material has no structural support contribution, the shell 49 can collapse when bitten. Where a material having significant structural characteristics are stuffed, it can catch and block further insertion. Where it is further forced, it can break the shell 49 either upon the occurrence of a blockage, as well as upon over-stuffing. The alternative of using thicker and more structurally hardened shells 49 detracts from the aesthetic and quality of the finished food product. The design and construction of a completely automated mechanical stuffer will either result in significant breakage of the shells 49, or will be prohibitively expensive.

A mechanical stuffing system is described which will permit rapid manual stuffing along with minimal chance for breakage of the shell 49. A simple stuffing support 85 is seen which is formed from a single sheet of material and which has four, upwardly folded flaps. A base 87 supports an end flap 89 and a pair of side flaps 91 and a front flap 93. End flap 89 is designed as a food stop. The front flap 93 has a pair of slots occupied by bushings 95, which may be preferably made of nylon or plastic.

Referring to FIG. 8, a side view of the bushing 95 is seen as having an "H" shape, including a main cylindrical body having a pair of enlarged flanges. This enables the bushing 95 to be supported between a semi-circular support and yet allow easy removal for cleaning and the like.

Referring to FIG. 9, a front view of the simple stuffing support 85 without the bushings 93 reveals a pair of front slots 97 each having a central circular portion 99 and a pair of flanking angled openings 101. The slots 97 have approximately the same shape as the slots 47 which were partially seen in FIG. 3. The bushings 93 are used to provide a low friction transition surface and create minimum wear on a push rod, and depending upon the design of the push rod can be used to help retain the push rods in operational use by preventing their slipping past the bushings 93.

The spacing of the slots 97 represent a wider spacing than is absolutely necessary to accommodate two shells 49, and "U" shaped spacers can be located on the base 87 to provide support and separation for the two shells 49 located within the simple stuffing support 85.

Referring to FIG. 10, a plan view of a stuffer rod 111 which can be cylindrical, oval, or square. Stuffer rod 111, if cylindrical, will have a first diameter cylindrical portion 113 and a second diameter cylindrical portion 115, and if square will have a first width cylindrical portion 113 and a second width cylindrical portion 115. The discussion will be continued based upon a cylindrical stuffer rod 111, but in the case of a square or other shaped stuffer rod 111, the openings in the bushings 95 will be appropriately matched. In one instance, a portion 113 having a diameter of about three eighths of an inch and a rod portion 115 having a diameter of about five-sixteenths of an inch may work well. A reduced diameter rod portion is used in conjunction with the bushings 95 to help prevent the stuffer rod 111 from becoming inadvertently disengaged from a stuffer box (to be shown) when the simple stuffing support 85 is used to support both cooked shells 49 and the stuffer box (to be shown).

A series of etched lines 117 and 119 may be formed to indicated to the user the maximum run and minimum engagement positions for the stuffer rod 111. This will help self train the user not to over-extend the stuffer rod 111 when stuffing begins, such as line 119, and not to continue stuffing once the stuffer rod shows resistance at a given level, such as line 117.

Referring to FIG. 11, a plan view of a stuffer rod 121 having a constant cross sectional dimension is seen. As before, the stuffer rod 121 can have any cross sectional shape, including cylindrical, oval, square, rectangular, pentagonal, hexagonal, and the like. In this instance, a single structure a diameter of about three eighths of an inch is seen. This dimension will work with the stuffer box to be seen in subsequent Figures, as well as through bushings 95 having a larger internal diameter, as there is no larger diameter portion to be captured. The constant diameter rod 121 may used for a less bulky material which may not be subject to shearing, for a given sized stuffer box dimension. A series of etched lines 123 and 125 may be formed to indicated to the user the maximum run and minimum engagement positions for the stuffer rod 121.

A stuffer apparatus will pass food to be stuffed through the bushings 95 of the simple stuffing support 85. As before, especially for a commercial production operation a pump operated stuffer may be used. For smaller operations, the main requirement of a stuffer unit is that it be simple and easy to clean thoroughly. Referring to FIG. 12, a perspective of a stuffer box 131 is seen. A base 133 interfits with a four sided box 135. Two of the sides of the box 135, including sides 137 and 139 are lower than two other opposite sides 141 and 143. In one embodiment of the invention, the lower edge of sides 137 and 139 may simply overlap the outside of the base 133, where the lower edges of sides 141 and 143 fit into grooves (not completely seen in FIG. 12) and form a stable engagement. The base 133 has lowered grooves to interfit with the lower edges of sides 137 and 139 to insure that the box 135 is properly oriented with respect to the base 133.

From a wall 145 of the base 133 a pair of canula shaped conduits 147 and 149 are seen. The longer extent of the cannulated shapes of the canula shaped conduits 147 and 149 at the bottom extent of the canula shaped conduits 147 and 149. This enables the canula shaped conduits 147 and 149 to become more easily inserted into the ends of the cooked shells 49. Having the ends of the canula shaped conduits 147 and 149 oriented to the bottom will insure that less food spillage will occur upon docking and un-docking of the stuffer box 131 with respect to the simple stuffing support 85.

Also partially seen in FIG. 12 is a hopper feed area 151 surrounding a hopper opening 153. Both the hopper feed area 151 and hopper opening 153 may be machined into an upper surface 155 of the base 133. The removable four sided box 135 gives the cleaner wide open access to the hopper feed area 151, hopper opening 153, and upper surface 155. The canula shaped conduit 147 is in fluid communication with its respective hopper opening 153, while the canula shaped conduit 149 is in fluid communication with its respective hopper opening (not seen in FIG. 12). Both the canula shaped conduits 147 and 149 and their respective hopper openings are in communication with their respective through bores which extend horizontally through the base 133. The back openings cannot be seen in FIG. 12 but are located just under the side 143. The stuffer rods 111 and 121 operate from the back openings.

Referring to FIG. 13, a top plan view of the base 133 with the four sided box 135 removed illustrates further details. Back openings are seen as back opening 161 which is in fluid communication with a through bore 163, the hopper opening 153 and canula shaped conduit 147. Similarly, a back opening 165 is in fluid communication with a through bore 167, a hopper opening 169 and canula shaped conduit 147. The through bores 163 and 167 will have a shape matching the stuffer rods 111 and 121. Hopper opening 169 is surrounded by a hopper feed area 171. A front groove 173 for supporting a lower edge of the side 141 is seen, as is a rear groove 175 for supporting a lower edge of the side 143.

Referring to FIG. 14, a side view of the base 133 is seen along with a clearer view of the grooves 173 and 175. As can be seen from FIGS. 13 and 14, the bores 163 and 167 are generally linear. Note also that the hopper feed areas 151 and 171 could be closer together, but that separation enables additional control of the material fed through those hopper feed areas 151 and 171.

Referring to FIG. 15, a top down view illustrates the mating parts of the simple stuffing support 85 which supports a pair of cooked shells 49 and the stuffer box 131. Also seen for the first time is one or more shell separator structures 181 which may be a simple "U" shaped channel tack welded to the base 87 of the simple stuffing support 85. Note that the canula shaped conduits 147 and 149 are seen as extending into the cooked shells, and that one of the shell separator structures 181 is positioned somewhat as a stop for stabilizing the stuffer box 131 in the direction of the cooked shells 49.

Any material within the four sided box 135 will fall into the hopper openings 153 and 169 where it may be gently pushed forward by the stuffer rod 121 (or stuffer rod 111). The spacing shown between the front flap 93 and the stuffer box 131 may exist or there may be a close fit. Where the structures 181 are moveable, such as by engagement in a series of slots in the base 87 of the simple stuffing support 85, the structures 181 can be moved about to accommodate different lengths of cooked shells 49, and different sized stuffer boxes 131.

Where stuffer rod 111 is used, note that its withdrawal will be limited by the bushings 95 to prevent the end of the stuffer rod 111 from becoming disengaged from the stuffer box 131 and thus saving the time necessary to re-insert it. This enables a much more mechanically affirmative mode of action. Movement of stuffer rod 111 may be set to either partially or completely clear the hopper opening 153 to enable material present over hopper feed area 151 and hopper opening 153 will fall into the hopper feed area 151. Each time the stuffer rod 111 is advanced, the material within the feed area 151 will be advanced through the canula shaped conduit 147 and into the shell 49. It is understood that the hopper feed area 151 and hopper opening 153 could be made longer to load more material per forward stroke of the stuffer rod 121, but increasing the length of the hopper opening 153 could also compact the food stuffing present and subject the shell to a greater chance of damage or breakage. The smaller the amount loaded with each stroke of the stuffer rod 121, the more gentle the loading steps will become.

Referring to FIGS. 16-19, one embodiment of a handling tool 191 is seen. The handling tool 191 is described which can be used to engage, carry and disengage the hollow open ends of the cylinder mandrel 21. The handling tool 191 has a main cylindrical body 193 which should be long enough to manually grasp with enough distance between main cylindrical body 193 and a conical section 195 which will be inserted into the through bore 27 of cylinder mandrel 21 to form an interference fit. The interference fit will depend upon the force with which the handling tool 191 is inserted, as well as the taper of the conical section 195.

A blunt end 197 is provided to make the handling tool 191 less of an injury and destruction threat during use. A sharp tip might encourage user to more rapidly approach the cylinder mandrel 21 and a missed engagement would cause either damage to the cooked shell 49 or hand contact with the cylinder mandrel 21.

At the end of the handling tool 191 opposite the conical section 195 an end plate 199 is located. The end plate carries a curved notch 201 which should closely match the outer diameter of the cylindrical surface 23 of the cylinder mandrel 21. The axial edges of the curved notch 201 may be sharply angled.

At the end of the main cylindrical body 193 is an end plate 197 which functions as a combination end member, shell removal fitting and cleaning fitting. As an end member, it acts as an end grasp register for the main cylindrical body 193 so that users can "feel" the end of the handling tool 191 and preferentially keep the hand nearest the end. As a shell removal fitting, the end plate 199 curved notch 201 is made to fit over the exterior surface of the cylinder mandrel 21 and urged along the surface to help remove the cooked shell 49. This use enables the user to avoid touching the hot cylinder mandrel 21 just after cooking, as well as the hot cooked shell 49. As a cleaning fitting, the end plate 199 curved notch 201 can be closely conforming to the exterior of the smooth cylindrical surface 23 of the cylinder mandrel 21 so that movement of the end plate 199 along its length removes all debris including bits of the cooked shell 49 which either remained or was inadvertently stuck to the cylinder mandrel 21, as well as any debris the cylinder mandrel 21 may have picked up from the last cooking operation.

Referring to FIG. 19, an alternative embodiment of a cylinder mandrel is seen as a cylinder mandrel 211. Cylinder mandrel 211 may have the same dimensions for a smooth cylindrical surface 213 as were seen for smooth cylindrical surface 23. A pivot fitting 215 may be spring loaded to urge a keeper 217 against the smooth cylindrical surface 213. The nature of the spring fitting (not shown in FIG. 19) may be simply to urge the keeper 217 in one direction, or it may act with a cam action to enable the keeper 217 to assume a right angle with respect to the smooth cylindrical surface 213 to facilitate wrapping of the flauta material. In this position, the pivot fitting 215 may be freely rotatable about the axis of the smooth cylindrical surface 213 to enable the main extent of the cylinder mandrel 211 to rotate with respect to the pivot fitting 215. In the alternative, a tool such as a spring loaded pliers with radius gripping tips can be utilized with cylinder mandrels 21.

A handle 219 can be used to manipulate the keeper 217. Note that the fitting pivot point is raised slightly in the view of FIG. 19 with no flauta material present, so that a more even contact of the keeper 217 against the flauta material can occur when the flauta material is present. The keeper 217 can have a curvature about the smooth cylindrical surface 213 to match it, or more preferably of a lesser curvature to provide a better match with the exterior of the rolled flauta material which the keeper 217 is to hold in place.

At the end of the cylinder mandrel 211, a fitting 221 may include a flange 223 which is engaged by a fitting cylinder 225 which can attach to another structure. It is contemplated that a number of cylinder mandrels 211 may be supported by a common support to enable complete immersion in cooking oil so that more of the flauta material and the shell 49 produced may have a more direct contact with the cooking oil. The cylinder mandrel 211 and the combination of the cylinder mandrel 21 along with the multi support tray 57 are just two example of a structures which facilitate securing of the flauta material in place during cooking.

The system of the present invention can be used to prepare shells 49 and stuff any cook hardened material with meats, vegetables, desserts, and more. Cooking of the flauta material may be accomplished in a preheated deep fryer to a range of 300 360 degrees, but other cooking media and environment may be used.

When utilizing some layers of material with which the shell 49 is formed, it may be necessary to pre-heat or pre-moisturize to obtain better self-adherence. Once rapid production begins the cylinder mandrel 21 may remain hot, and handling with the handling tool 191 permits a better result in which the cylinder mandrel 21 remains hot and covered with oil.

In terms of operation of the invention, place a tapered end of the conical section 195 of the handling tool 191 engages a cylinder mandrel 21 and is used to transfer it to the circular area 39 or rectangular area 41 of the rolling support 31. The cylinder mandrel 21 is placed about an one inch from the leading edge of a sheet of flauta material with the cylinder mandrel 21 pushed against the vertical stop 37. The leading edge of the flauta material is rolled over the cylinder mandrel 21 until it tucks in enough to begin rolling until it is completely wrapped around the cylinder mandrel 21. Keeping the roll tight, the cylinder mandrel 21 covered with the flauta material is transferred to one of the "V" shaped slots of the multi support tray 57 and placed in a position to make sure the outer, free edge of the rolled flauta material is facing down to keep it from unraveling. The weight of the cylinder mandrel 21 will keep it in place and shape.

The frying support 51 is loaded with other wrapped cylinder mandrels 21, and are immersed, supported by the multi support tray 57, in a deep fryer. After cooking for 1-2 minutes (depending upon the temperature of the oil and the type of flauta material used, lift the frying support 51 and allow some drainage over the cooking oil. Any tilting of the multi support tray 57 should be done with the guard tabs 59 or laterally extending wings 79 downward. The frying support 51 is positioned so that each protruding end of the cylinder mandrel 21 is over a corresponding notch 47 of the channel 45. As the frying support 51 is lowered, each of the grooves 25 of the exposed cylinder mandrel 21 engages its associated notch 47.

Once lowered, the frying support 51 the grooves 25 on the cylinder mandrels will hook themselves on the notches 47. As the frying support 51 is then moved laterally away from the channel 45, the cylinder mandrels 21 bearing the cooked shell 49 are dragged from the multi support tray 57 and supported at an angle over the board 35.

Next, the handling tool 191 can be used to begin to slide the shell 49 away from the channel 45 along its cylinder mandrel 21. The handling tool 191 can be used to lift the cylinder mandrel 21 to enable the shell 49 to clear the board 35. The shells 49 are then transferred to the simple stuffing support 85 between a side flap 91 and a shell separator structure 181. The assembled stuffer box 131 is mated with the simple stuffing support 85, and food to be stuffed is added to the assembled stuffer box 131. Depending on the foodstuff selected, stuffer rod 111 or 121 is used to perform the stuffing operation. Each stuffing stroke should terminate when the user feels resistance on the stuffer rod 111 or 113. Once the shell 49 is full, the stuffer rod 111 or 113 is removed from the stuffer box 131 and the filled shell is removed from the simple stuffing support 85.

All of the components of the inventive system can be made in a variety of materials—plated metal, wire mesh metal, wire mesh rod, or approved plastics, hardwood, or any other moldable materials in a variety of colors. Metals used can be aluminum, iron, steel, stainless steel, titanium and more. Although the stuffer box 131 has been shown as having a two piece construction for ease of cleaning and a dual stuffing capacity, a stuffer can be used with unitary or multiple parts and may have multiple stuffing capacity. Two stuffer box 131 can be used with a two sided stuffing support 85 to stuff shells 49 from the middle outwardly. The stuffing combination shown in FIG. 15 or other stuffer can be made to work in a vertical or angled position. The operation of the stuffing rods 111 and 121 within the stuffer box can be made to operate by motor. All sizes for all components of FIGS. 1-19 can be varied as needed. Through bores 167, 27, and stuffer rods 111 and 121 can be of any shape, square, triangular, hexagonal, octagonal, and the like.

While the present invention has been described in terms of a food preparation system, and particularly to a multi-component user friendly system for semi-automated production of cooked shells, the present invention may be applied in any situation where formation and stuffing of structures is desired to yield a complete and integrated cooked shell production system of a scale from manual to batch-continuous operation.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A rolled shell maker and stuffer kit comprising:
   at least one cylinder mandrel having an axial through bore providing a form to wrap a material to be cooked;
   a frying support having a handle portion and a multi support tray for supporting multiple said cylinder mandrels during cooking;
   a drainage support having notches for engaging and holding said cylinder mandrel and for facilitating removal of said cylinder mandrel from said frying support and removal of cooked shells from said cylinder mandrels; and
   a handling tool having a conical section for engaging said axial through bore of said cylinder mandrel.

2. The rolled shell maker and stuffer kit as recited in claim 1 and further comprising a rolling support to facilitate wrapping of said cylinder mandrel with a material to be cooked.

3. The rolled shell maker and stuffer kit as recited in claim 2 wherein said rolling support and said drainage support is combined and attached to each other.

4. The rolled shell maker and stuffer kit as recited in claim 1 wherein said handling tool has an end plate at an end opposite said conical section for engaging and assisting in removal of said cooked shells from said cylinder mandrel.

5. The rolled shell maker and stuffer kit as recited in claim 1 and further comprising a keeper supported with respect to said cylinder mandrel to engage and help hold a material to be cooked close to the mandrel.

6. The rolled shell maker and stuffer kit as recited in claim 1 wherein said cylinder mandrel includes a groove to facilitate support from said drainage support.

7. A rolled shell maker and stuffer kit comprising:
   at least one cylinder mandrel having an axial through bore providing a form to wrap a material to be cooked;
   a frying support having a handle portion and a multi support tray for supporting multiple said cylinder mandrels during cooking;
   a drainage support having notches for engaging and holding said cylinder mandrel and for facilitating removal of said cylinder mandrel from said frying support and removal of cooked shells from said cylinder mandrels; and
   a stuffer box having a through bore, the through bore having a hopper opening, a first end of the through bore in communication having a canula shaped conduit for engaging an open end of a cooked shell, and a second end of the through bore;
   a stuffer rod insertable into the second end of the through bore to push food dropping through the hopper opening, into and through the canula shaped conduit and into the cooked shell.

\* \* \* \* \*